(12) United States Patent
Sixt et al.

(10) Patent No.: US 7,786,198 B2
(45) Date of Patent: Aug. 31, 2010

(54) CROSSLINKABLE SUBSTANCES BASED ON ORGANOSILICON COMPOUNDS

(75) Inventors: Torsten Sixt, Mehring-Öd (DE); Franz Neuhauser, Geretsberg (AT)

(73) Assignee: Wacker Chemie AG, Munich (DE)

( * ) Notice: Subject to any disclaimer, the term of this patent is extended or adjusted under 35 U.S.C. 154(b) by 529 days.

(21) Appl. No.: 11/695,702

(22) Filed: Apr. 3, 2007

(65) Prior Publication Data

US 2007/0244230 A1    Oct. 18, 2007

(30) Foreign Application Priority Data

Apr. 10, 2006   (DE) ................ 10 2006 016 753

(51) Int. Cl.
*C08K 5/5317* (2006.01)
(52) U.S. Cl. .............. 524/123; 525/477; 525/478; 528/15; 528/31; 528/32
(58) Field of Classification Search .............. None
See application file for complete search history.

(56) References Cited

U.S. PATENT DOCUMENTS

| | | | |
|---|---|---|---|
| 3,445,420 A | | 5/1969 | Kookootsedes et al. |
| 4,100,089 A | * | 7/1978 | Cammack et al. ........... 524/417 |
| 4,223,071 A | * | 9/1980 | Boyer et al. ............. 174/110 R |
| 4,329,275 A | | 5/1982 | Hatanaka et al. |
| 4,840,974 A | | 6/1989 | Gross et al. |
| 4,851,452 A | | 7/1989 | Gross et al. |
| 5,668,205 A | * | 9/1997 | Yoshida et al. ............... 524/268 |
| 5,998,548 A | | 12/1999 | Brennenstuhl et al. |
| 7,094,858 B2 | | 8/2006 | Sixt et al. |
| 2002/0192528 A1 | | 12/2002 | Sixt et al. |

FOREIGN PATENT DOCUMENTS

| | | |
|---|---|---|
| DE | 197 35 813 A1 | 2/1999 |
| DE | 10259613 A1 | 7/2004 |
| EP | 0761759 A2 | 3/1997 |
| EP | 1 263 065 A1 | 12/2002 |
| EP | 1 479 720 A1 | 11/2004 |
| WO | 98/29497 | 7/1998 |
| WO | WO 2007/132932 | * 11/2007 |

OTHER PUBLICATIONS

US 7,094,858 B2 is corresponding to EP 1 479 720 A1.
US 5,998,548 is corresponding to DE 197 35 813 A1.
US 2002/0192528 A1 is corresponding to EP 1 263 065 A1.
Patbase abstract corresponding to DE 102 59 613 A1.
Patbase abstract corresponding to EP 0 761 759 A2.

* cited by examiner

*Primary Examiner*—Marc S Zimmer
(74) *Attorney, Agent, or Firm*—Brooks Kushman P.C.

(57) ABSTRACT

The present invention relates to substances, crosslinkable by attachment of an Si-bonded hydrogen atom to an aliphatic multiple bond, which comprise at least one compound of the formula $$R^3P(O)(OH)_2 \qquad (III)$$

and/or the derivatives thereof,
$R^3$ being an optionally substituted hydrocarbon radical which can be interrupted by heteroatoms.

17 Claims, No Drawings

CROSSLINKABLE SUBSTANCES BASED ON ORGANOSILICON COMPOUNDS

BACKGROUND OF THE INVENTION

1. Field of the Invention

The invention relates to crosslinkable substances based on organosilicon compounds, to the preparation thereof and to the use thereof.

2. Background Art

Addition-crosslinking substances crosslink by attachment of Si-bonded hydrogen to an aliphatic carbon-carbon multiple bond (hydrosilylation) in the presence of a catalyst, typically a platinum compound. After mixing the components, a ready-for-use, crosslinkable composition is obtained, however, such compositions frequently exhibit only a limited pot life, since the crosslinking reaction is already underway. This makes it necessary to use the composition soon after its preparation. There have therefore been many attempts to prevent premature initiation of the crosslinking reaction, which normally proceeds even at ambient temperature, using "inhibitors". Reference may be had for example, to U.S. Pat. No. 3,445,420, which discloses the use of vinyl-rich siloxanes or α-hydroxyacetylenes as inhibitors. These inhibitors inhibit both hydrogen elimination by condensation, and crosslinking via hydrosilylation.

Phosphorus(III) compounds, such as phosphites or trialkylphosphines, are generally very powerful inhibitors which normally so strongly inhibit platinum that the crosslinking and hydrogen evolution process either fails completely, or the composition does not completely crosslink and remains tacky. In the patent literature, the use of P(III) compounds has already been known for a long time. Trialkyl- or triarylphosphines have been proposed as inhibitors, alone or in the form of, e.g., tetrakisphosphineplatinum complexes and also in mixtures with platinum/vinyl complexes (e.g., U.S. Pat. No. 4,851,452) as catalyst/inhibitor system; similar attempted solutions have been pursued for the preparation of rapidly foaming silicone compositions with particularly low density. Reference may be made for this, for example, to U.S. Pat. No. 4,851,452 and U.S. Pat. No. 4,840,974. U.S. Pat. No. 4,329,275 discloses systems based on phosphorus(III) which oxidize a phosphite to give the corresponding phosphate, by the addition of peroxide under the action of heat, which phosphate then for lack of free electron pairs can no longer act as a sigma donor and consequently no longer acts as an inhibitor. This naturally results in the restriction to thermally curing systems which quickly vulcanize, and during the course of which, again exhibit kinetics of hydrogen formation and crosslinking which closely overlap. Trialkyl or triaryl phosphites are used with other thermally curing systems. Reference may had, for example, to EP-A 0 761 759 and WO 98/29497, which disclose the possibility of crosslinking due to mono- or polydentate phosphite ligands to be initiated only by the influence of heat.

SUMMARY OF THE INVENTION

A subject matter of the invention are compositions, crosslinkable by attachment of an Si-bonded hydrogen atom to an aliphatic multiple bond, which comprise at least one compound of the formula $$R^3P(O)(OH)_2 \quad (III)$$

and/or the derivatives thereof, $R^3$ being an optionally substituted hydrocarbon radical which can be interrupted by heteroatoms.

DETAILED DESCRIPTION OF THE PREFERRED EMBODIMENT(S)

The compositions according to the invention can be any composition which can be crosslinked by attachment of an Si-bonded hydrogen atom to an aliphatic multiple bond, for example, single-component organopolysiloxane compositions which vulcanize at elevated temperature or two-component organopolysiloxane compositions which can vulcanize at ambient temperature. The crosslinkable composition can, in this connection, be free from fillers but can also comprise active or inactive fillers.

The composition according to the invention can also be self-foaming compositions, i.e. addition-crosslinking compositions which split off hydrogen in a condensation reaction with protic components, such as, e.g., water, alcohols or polymers comprising OH groups, with components exhibiting Si-bonded hydrogen atoms.

The types and amounts of the components normally used in such compositions are already known. The crosslinkable substances are preferably those which comprise:

(A) compounds which bear radicals with aliphatic carbon-carbon multiple bonds, (B) organosilicon compounds with Si-bonded hydrogen atoms or, in place of or in addition to (A) and (B), (AB) organosilicon compounds which bear SiC-bonded radicals with aliphatic carbon-carbon multiple bonds and Si-bonded hydrogen atoms, (C) a compound of the formula (III) and/or a derivative thereof, and (D) a catalyst which promotes the attachment of an Si-bonded hydrogen atom to an aliphatic multiple bond.

The compounds (A) and (B) used in the compositions according to the invention are, as is known, chosen so that crosslinking is possible. Thus, for example, in general compound (A) will bear at least two aliphatically unsaturated radicals and siloxane (B) at least three Si-bonded hydrogen atoms, or compound (A) will bear at least three aliphatically unsaturated radicals and siloxane (B) exhibits at least two Si-bonded hydrogen atoms.

Component (A) preferably includes aliphatically unsaturated organosilicon compounds, in which use may be made of all aliphatically unsaturated organosilicon compounds useful in addition-crosslinking compositions, including, for example, silicone block copolymers with urea segments, silicone block copolymers with amide segments and/or imide segments and/or ester amide segments and/or polystyrene segments and/or silarylene segments and/or carborane segments and silicone graft copolymers with ether groups.

Organosilicon compounds (A) which are preferably used bear SiC-bonded radicals with aliphatic carbon-carbon multiple bonds, and are linear or branched organopolysiloxanes formed of units of the formula $$R_a R^1_b SiO_{(4-a-b)/2} \quad (I)$$

in which

R can be identical or different and represents a radical free from aliphatic carbon-carbon multiple bonds, $R^1$ can be identical or different and represents a monovalent, optionally substituted, SiC-bonded hydrocarbon radical with an aliphatic carbon-carbon multiple bond, a is 0, 1, 2 or 3 and b is 0, 1 or 2, with the proviso that the sum a+b is less than or equal to 3 and, on average, at least 2 radicals $R^1$ are present per molecule.

Radical R encompasses both mono- or polyvalent radicals, the polyvalent radicals, for example divalent, trivalent and tetravalent radicals, then linking together several, for instance two, three or four, siloxy units of the formula (I).

R comprises a monovalent radical, for example, —F, —Cl, —Br, organyloxy radicals and SiC-bonded, optionally substituted, hydrocarbon radicals which can be interrupted by oxygen atoms or the —C(O)-group and also divalent radicals Si-bonded at both ends according to formula (I). When radical R is an SiC-bonded substituted hydrocarbon radical, preference is given, as substituents, to halogen atoms, phosphorus-comprising radicals, cyano radicals, organyloxy radicals and amino radicals.

Examples of radicals R are alkyl radicals such as the methyl, ethyl, n-propyl, isopropyl, 1-n-butyl-, 2-n-butyl-, isobutyl, tert-butyl, n-lentil, isopentyl, neopentyl, and tert-pentyl radicals, hexyl radicals such as the n-hexyl radical, heptyl radicals such as the n-heftily radical, octyl radicals such as the n-octyl radical and isooctyl radicals such as the 2,2,4-trimethylpentyl radical, nonyl radicals such as the n-nonyl radical, decay radicals such as the n-decyl radical, cycloalkyl radicals, such as cyclopropyl, cyclopentyl, cyclohexyl and cycloheptyl and methylcyclohexyl radicals, aryl radicals such as phenyl radicals, o-, m-, and p-tolyl radicals, xylyl radicals and ethylphenyl radicals, and aralkyl radicals such as the benzyl radical and the α- and β-phenylethyl radicals.

Radical R preferably is a monovalent SiC-bonded, optionally substituted, hydrocarbon radical with 1 to 18 carbon atoms which is free from aliphatic carbon-carbon multiple bonds, more preferably a monovalent SiC-bonded hydrocarbon radical with 1 to 6 carbon atoms which is free from aliphatic carbon-carbon multiple bonds, and in particular, a methyl or phenyl radical.

Radical $R^1$ can be any group available for an addition reaction (hydrosilylation) with an SiH-functional compound. If radical $R^1$ is an SiC-bonded, substituted hydrocarbon radical, preference is given, as substituents, to halogen atoms, cyano radicals and organyloxy radicals.

Radical $R^1$ preferably bears an alkenyl or alkynyl group, and has 2 to 16 carbon atoms, such as the vinyl, allyl, methallyl, 1-propenyl, 5-hexenyl, ethynyl, butadienyl, hexadienyl, cyclopentenyl, cyclopentadienyl, cyclohexenyl, vinylcyclohexylethyl, divinylcyclohexylethyl, norbornenyl, vinylphenyl and styryl radicals, the vinyl, allyl and hexenyl radicals being particularly preferred.

The molecular weight of constituent (A) can vary within wide limits, approximately between $10^2$ and $10^6$ g/mol. Thus, constituent (A) can be, for example, a relatively low molecular weight alkenyl-functional oligosiloxane, such as 1,2-divinyltetramethyldisiloxane, and may range to highly polymerized polydimethylsiloxanes, e.g. with a molecular weight of $10^5$ g/mol (number-average, determined by NMR), having available vinyl groups Si-bonded along the chains or at the chain ends. Also, the structure of the molecules forming constituent (A) is not fixed; in particular, the structure of a high molecular weight, thus oligomeric or polymeric, siloxane can be linear, cyclic, branched or even resin-like or network-like.

Particular preference is given, as component (A), to the use of vinyl-functional, essentially linear, polydiorganosiloxanes with a viscosity of 0.6 to 500,000,000 mm²/S, more preferably of 10 to 50,000,000 mm²/S, in each case at 25° C.

Organosilicon compound (B) may be any hydrogen-functional organosilicon compound useful in addition-crosslinking substances. Naturally, mixtures of different siloxanes satisfying the criteria of the constituent (B) can also be used. In particular, the molecules forming constituent (B) can, in addition to the obligatory SiH-groups, also optionally at the same time comprise aliphatically unsaturated groups.

Use is preferably made, as organosilicon compounds (B) which bear Si-bonded hydrogen atoms, of linear, cyclic or branched organopolysiloxanes which comprise units of the formula

in which $R^2$ can be identical or different and has a meaning given above for radical R, c is 1, 2 or 3 and d is 1 or 2, with the proviso that the sum of c+d is less than or equal to 3 and, on average, at least two Si-bonded hydrogen atoms are present per molecule.

Preferably, organopolysiloxane (B) comprises Si-bonded hydrogen in the range from 0.01 to 2% by weight, based on the total weight of the organopolysiloxane (B). The molecular weight of constituent (B) can likewise vary within a wide range, approximately between $10^2$ and $10^6$ g/mol. Thus, constituent (B) can be, for example, a relatively low molecular weight. SiH-functional oligosiloxane, such as tetramethyldisiloxane, ranging upwards to highly polymerized polydimethylsiloxanes having available SiH groups along the chains or at the chain ends, or silicone resins exhibiting SiH groups. Also, the structure of the molecules forming constituent (B) is not fixed; in particular, the structure of a high molecular weight, thus oligomeric or polymeric, SiH-comprising siloxane can be linear, cyclic, branched or even resin-like or network-like.

Component (B) most preferably is a low molecular weight. SiH-functional compound, such as 1,1,3,3-tetramethyldisiloxane, tetrakis(dimethylsiloxy)silane, 1,1,1,3,5,5,5-heptamethyltrisiloxane and tetramethylcyclotetrasiloxane, or a high molecular weight. SiH-containing siloxane, such as poly(hydromethyl)siloxane and poly(dimethylhydromethyl)siloxane with a viscosity at 25° C. of 1 to 1,000,000 mm²/S, or analogous SiH-comprising compounds in which a portion of the methyl groups is replaced by 3,3,3-trifluoropropyl or phenyl groups.

Constituent (B) is preferably present in the crosslinkable compositions in such an amount that the molar ratio of SiH groups to aliphatically unsaturated groups is greater than 0.1. If the crosslinkable compositions are not self-foaming substances, the molar ratio of SiH groups to aliphatically unsaturated groups is preferably from 0.1 to 20, more preferably between 0.8 and 5.0. If the crosslinkable compositions are self-foaming compositions, the molar ratio of SiH groups to aliphatically unsaturated groups preferably lies between 10 and 250, more preferably between 10 and 50.

If organosilicon compounds (AB) are used, these preferably exhibit, per molecule, at least 2 radicals $R^1$ and at least 2 Si-bonded hydrogen atoms. The organosilicon compounds (AB) preferably have a viscosity of 0.01 to 500,000 Pa·s, more preferably 0.1 to 100,000 Pa·s, in each case at 25° C.

The components (A) and (B) or (AB) used according to the invention are commercial products or can be prepared according to processes common in chemistry.

Examples of radical $R^3$ are the examples given for R and $R^1$. Radical $R^3$ preferably is a hydrocarbon radical with 1 to 14 carbon atoms, optionally substituted by chloro or alkoxy groups and optionally interrupted by O and N, more preferably alkyl or aryl radicals with 6 to 10 carbon atoms, and in particular the octyl radical.

Examples of component (C) are alkylphosphonic acids, such as aminomethylphosphonic acid, 1-propylphosphonic acid, 2-chloroethylphosphonic acid, 1-octylphosphonic acid and 1-decylphosphonic acid, arylphosphonic acids, such as 1-naphthylphosphonic acid, 1-naphthylmethylphosphonic acid, phenylphosphonic acid, methoxyphenylphosphonic acid, methylbenzylphosphonic acid and benzylphosphonic acid, and the derivatives thereof, such as anhydrides, acid chlorides and esters.

Component (C) preferably are alkylphosphonic acids, most preferably, octylphosphonic acid.

The composition according to the invention preferably comprise constituent (C) in amounts of 0.01 to 10 parts by weight, more preferably 0.05 to 5 parts by weight, most preferably 0.05 to 1 part by weight, in each case based on 100 parts by weight of constituent (A).

The component (C) used according to the invention are commercial products or can be prepared according to processes common in organic chemistry.

As component (D), any catalyst useful in compositions which can be crosslinked by attachment of an Si-bonded hydrogen to an aliphatic multiple bond may be used. Component (D) preferably is a hydrosilylation catalyst from Group 8, 9 or 10 of the Periodic Table. In this connection, use may be made of metals and compounds thereof, such as platinum, rhodium, palladium, iron, ruthenium and iridium, preferably platinum. The metals can optionally be fixed to finely divided supports, such as active charcoal or metal oxides, such as aluminum oxide or silicon dioxide.

Hydrosilylation catalysts (D) are preferably platinum and platinum compounds, platinum compounds which are soluble in polyorganosiloxanes being particularly preferred, for example platinum/olefin complexes of the formulae $(PtCl_2.olefin)_2$ and $H(PtCl_3.olefin)$, use preferably being made of alkenes with 2 to 8 carbon atoms such as ethylene, propylene, isomers of butene and of octene or cycloalkenes with 5 to 7 carbon atoms, such as cyclopentene, cyclohexene and cycloheptene. Additional soluble platinum catalysts are the platinum/cyclopropane complex of the formula $(PtCl_2C_3H_6)_2$, the reaction products of hexachloroplatinic acid with alcohols, ethers and aldehydes or mixtures of the same or the reaction product of hexachloroplatinic acid with methylvinylcyclotetrasiloxane in the presence of sodium bicarbonate in ethanolic solution. Use may also be made of platinum catalysts with phosphorus, sulfur and amine ligands, such as, e.g., $(Ph_3P)_2PtCl_2$. Particular preference is given, as component (D), to complexes of platinum with vinylsiloxanes, such as sym-divinyltetramethyldisiloxane.

The amount of the hydrosilylation catalyst (D) depends on the crosslinking rate desired, on the respective use of the composition and also economic viability. The composition according to the invention preferably comprise platinum catalysts (D) in such amounts to provide a platinum content of 0.05 to 500 ppm by weight (parts by weight per million parts by weight), more preferably 0.5 to 200 ppm by weight, and most 5 to 100 ppm by weight, in each case based on the total weight of the composition.

In addition to the components (A) to (D), the curable compositions according to the invention can further comprise any additional materials useful for the preparation of addition-crosslinking compositions.

Examples of reinforcing fillers which can be used as component (E) in the composition according to the invention are pyrogenic or precipitated silicas with BET surface areas of at least 50 $m^2/g$, preferably 50 to 500 $m^2/g$, more preferably 150 to 300 $m^2/g$, and also carbon blacks and active charcoals such as furnace black and acetylene black, pyrogenic and precipitated silicas with BET surfaces of at least 50 $m^2/g$ being preferred. The silicas can optionally also be present as mixed oxides or oxide mixtures with the oxides of the metals aluminum, magnesium, calcium, barium, zinc, zirconium and/or titanium. Furthermore, fillers such as quartz powder, diatomaceous earth, silicates, zeolites, metal oxides such as iron oxide, zinc oxide, titanium dioxide or aluminum oxide, metal carbonates such as calcium carbonate, magnesium carbonate or zinc carbonate, metal sulfates, mica, siloxane resins, clays, treated or untreated graphite and chalk, can be used as component (E).

The abovementioned fillers can have a hydrophilic nature or can be surface-treated or rendered hydrophobic according to known processes. On incorporating hydrophilic fillers, the addition of a hydrophobizing agent is generally necessary. The content of active reinforcing filler (E) in the crosslinkable composition according to the invention ranges from 0 to 70% by weight, preferably 0 to 50% by weight.

The composition according to the invention can, if desired, comprise, as constituent (F), additional additives up to a proportion of 96% by weight, preferably 0.0001 to 40% by weight. These additives can, e.g., be inactive fillers, resin-like polyorganosiloxanes other than the organosilicon compounds (A), (B) and (AB), dispersing agents, rheology additives, nonpolar solvents, polar protic components, bonding agents, pigments, dyes, plasticizers, organic polymers, heat stabilizers, fillers for thermal conductivity, and the like. These include additives such as nitrides, for example metal nitrides and boron nitride, carbides such as boron carbide and silicon carbide, metal dusts, plastic powders, dyes and pigments. Furthermore, salts which decompose with the evolution of gas, such as diazo compounds, alkali metal, ammonium and alkaline earth metal carbonates or alkali metal, ammonium and alkaline earth metal hydrogencarbonates, may be employed.

Examples of nonreinforcing fillers, e.g. fillers with a specific surface according to the BET process of less than 50 $m^2/g$, which can be used as component (F) are synthetic silicates, natural silicates, quartz powder, diatomaceous earth, calcium silicate, zirconium silicate, zeolites, metal oxides such as iron oxide, zinc oxide, titanium dioxide or aluminum oxide, metal carbonates such as calcium carbonate, magnesium carbonate or zinc carbonate, metal sulfates, mica, clays, lithopones, carbon blacks, treated or untreated graphite, and chalk, it being possible for the abovementioned inactive fillers to be rendered hydrophobic. Glass fibers and glass fiber products, such as mats, rovings, woven fabric, nonwoven fabric and the like, and also glass microbeads can likewise be used as inactive fillers (F), which, however, is not preferred when foams are to be prepared.

Furthermore, the composition according to the invention can comprise polar protic components (F), e.g. proton donors such as alcohols, silanols or hydroxy-functional polymers such as α,ω-dihydroxypolydiorganosiloxanes or resins comprising silanol groups, other than components (A), (B) and (AB), or water, it being possible for the latter to be present in the form of oil emulsions, bonded or adsorbed in fillers, such as precipitated silica, zeolite or also bonded as water of crystallization in inorganic salts, such as, for example, ammonium, alkali metal or alkaline earth metal phosphates in the various degrees of protonation thereof.

Examples of the optionally used polar protic components (F) optionally used are water, alcohols such as methanol, ethanol, n-propanol, isopropanol and n-butanol, silanols of the formula R'SiOH with R' the same as a meaning given for R and $R^1$, such as, for example, trimethylsilanol and triethylsilanol, and also siloxanes bearing hydroxyl groups which can be formed, analogously to component (A), from units of the formula (I), such as α,ω-dihydroxypolydimethylsiloxanes, preference being given to water, ethanol, n-propanol and isopropanol.

If the compositions according to the invention are self-foaming compositions, the use of a polar protic component (F) is preferred, the amount to be used depending on the foam properties desired and on the concentration of proton donors already introduced by the other components.

If polar protic components (F) are used, they are preferably used in amounts such that the molar ratio of SiH groups to OH groups or proton donors in the substance is 0.1 to 500, more preferably 1 to 20.0.

Furthermore, it is possible for additives (G) which are used for the additional selective adjusting of the potlife, kick-off temperature and crosslinking rate of the composition to be present according to the invention. These inhibitors and stabilizers are very well known in the field of addition-crosslinking substances. Exemplary conventional inhibitors are acetylenic alcohols, such as 1-ethynyl-1-cyclohexanol, 2-methyl-3-butyn-2-ol, 3,5-dimethyl-1-hexyn-3-ol and 3-methyl-1-dodecyn-3-ol, polymethylvinylcyclosiloxanes, such as 1,3,5,7-tetravinyltetramethyltetracyclosiloxane, low molecular weight silicone oils with methylvinyl$SiO_{2/2}$ groups and/or $R_2$vinyl$SiO_{1/2}$ end groups, such as divinyltetramethyldisiloxane or tetravinyldimethyldisiloxane, trialkyl cyanurate, alkyl maleates, such as diallyl maleate, dimethyl maleate and diethyl maleate, alkyl fumarates, such as diallyl fumarate and diethyl fumarate, organic hydroperoxides, such as cumene hydroperoxide, tert-butyl hydroperoxide and pinane hydroperoxide, organic peroxides, organic sulfoxides, organic amines, diamines and amides, phosphanes and phosphites, nitriles, triazoles, diaziridines and oximes.

The compositions preferably comprise no further constituents in addition to the components (A) to (G).

The compositions according to the invention are preferably those which comprise:

(A) compounds which bear radicals with aliphatic carbon-carbon multiple bonds, (B) organopolysiloxanes with Si-bonded hydrogen atoms or, in place of (A) and (B), (AB) organosilicon compounds which bear SiC-bonded radicals with aliphatic carbon-carbon multiple bonds and Si-bonded hydrogen atoms, (C) alkylphosphonic acid, (D) catalyst which promotes the attachment of an Si-bonded hydrogen to an aliphatic multiple bond, optionally (E) reinforcing fillers and optionally (F) additional constituents and optionally (G) additional materials.

The compositions are most preferably those which comprise:

(A) essentially linear compounds which bear, on average, at least two radicals with aliphatic carbon-carbon multiple bonds, (B) organopolysiloxanes with, on average, at least two Si-bonded hydrogen atoms or, in place of (A) and (B), (AB) organosilicon compounds which bear both SiC-bonded radicals with aliphatic carbon-carbon multiple bonds and Si-bonded hydrogen atoms, (C) alkylphosphonic acids in amounts of 0.01 to 10 parts by weight, based on 100 parts by weight of constituent (A), (D) catalysts which promote the attachment of an Si-bonded hydrogen to an aliphatic multiple bond, (E) reinforcing fillers, (F) additional constituents, and optionally (G) additional materials.

The compositions are in particular self-foaming substances, i.e. addition-crosslinking compositions which split off hydrogen in a condensation reaction with protic components, such as water, alcohols, silanol or hydroxy-functional polymers, by reaction with the crosslinking agent (B).

The compositions can, if desired, be dissolved, dispersed, suspended or emulsified in liquids. The substances according to the invention can, in particular depending on the viscosity of the constituents and also filler content, be low in viscosity and pourable, exhibit a pasty consistency or also represent pliable high-viscosity substances, as may, as is known, be the case with the composition frequently described among experts as RTV-1, RTV-2, LSR and HTV.

The compositions can be prepared according to known processes, for example by homogenizing the individual components. In this connection, the mixing is preferably carried out depending on the viscosity of (A), e.g. with a stirrer, in a high-speed stirrer, on a roll or in a kneader. The components (A) to (G) can in each case be a single type of such a component, as also a mixture of at least two different types of such a component.

The compositions which can be crosslinked by attachment of Si-bonded hydrogen to aliphatic multiple bonds can be crosslinked under the same conditions as compositions crosslinkable by hydrosilylation reaction known hitherto. Preferably, in this connection, temperatures of 0 to 220° C., more preferably of 10 to 80° C., and a pressure of the ambient atmosphere, thus pressures approximately from 900 to 1100 hPa, are generally used. However, higher or lower temperatures and pressures can also be applied. The crosslinking can also be carried out photochemically with energetic radiation, such as, e.g., visible light short-wavelength and UV light, or with a combination of thermal and photochemical activation.

An additional subject matter of the present invention concerns molded articles such as films and laminates, prepared by crosslinking the compositions according to the invention. The elastomeric properties of the molded articles also comprise the entire spectrum, beginning with extremely soft silicone gels through rubber-like materials up to highly crosslinked silicones with a glass-like behavior. The molded articles preferably have a density of 0.1 to 5 $g/cm^3$, more preferably 0.15 to 2 $g/cm^3$, in each case at 20° C. and 1013 hPa.

The compositions and the crosslinking products prepared therefrom can be used for all purposes for which elastomers or organopolysiloxane substances which can be crosslinked to give elastomers are useful. This comprises, for example, the silicone coating or impregnation of any substrate, the preparation of moldings, e.g. in the injection molding process, vacuum extrusion process, extrusion process and calendering, shape casting and compression molding, and impression molding, and the use as sealing compounds, embedding compounds and potting compounds.

The compositions according to the invention have the advantage that they are simple to prepare and handle. A fundamental advantage in comparison with other systems is that the density of the vulcanized product is virtually completely independent of the pot life, especially with self-foaming compositions. Due to the strong inhibiting effect, the density, pot life and foam time are also independent of the thickness of the layer. With other known systems, a dependence of foaming time and density of the vulcanized product on the thickness of the layer may be observed.

An additional major advantage of the inventive compositions is the freedom from internal pressure of foaming formulations. In ordinary foaming operation in a mold or in a closed container, a strong internal pressure builds up, because of the simultaneous vulcanization and foaming, and causes, on removing from the mold, a more or less pronounced dimensional inexactitude. Accordingly, the self-foaming mixtures according to the invention are particularly suitable for the preparation of molded articles. The compositions have the further advantage that a broad spectrum of pot lives and tack-free times can be specifically targeted and the vulcanization can be thermally accelerated. The compositions have in addition the advantage that they exhibit a very good stability on storage.

In the examples described below, all figures for parts and percentages refer to the weight, unless otherwise indicated. Unless otherwise indicated, the following examples are carried out at a pressure of the ambient atmosphere, thus approximately at 1000 hPa, and at ambient temperature, thus at approximately 20° C., or at a temperature which is produced while mixing together the reactants at ambient temperature without additional heating or cooling.

The pot life is usually defined as the period of time during which the mixed composition ready for application is still capable of being worked by a person skilled in the art, thus a casting compound which can be poured, or a self-foaming composition which does not yet begin to foam. Thus, the pot life with silicones is generally limited by a defined maximum possible increase in viscosity, after exceeding which the composition can no longer be worked without restriction. With foams, the beginning of foaming or bubble formation, visible by an expansion in volume, is generally defined as the end of the pot life. The Shore A hardness is determined according to DIN (Deutsche Industrie Norm) 53505 (edition August 2000). The freedom from tack was determined manually.

EXAMPLE 1

Preparation of the A Component:

40 parts of a vinyldimethylsiloxy-terminated polydimethylsiloxane with a viscosity of 20,000 mPa·s at 25° C. and 20 parts of a pyrogenic silica with a BET surface of 300 m$^2$/g were processed to give a homogeneous mixture. 25 parts of a vinyldimethylsiloxy-terminated polydimethylsiloxane with a viscosity of 1000 mPa·s at 25° C. and 15 parts of a trimethylsilyl-terminated polydimethylpolysiloxane with a viscosity of 50 mPa·s at 25° C. were added to this. Furthermore, 1 part of a silicone oil emulsion consisting of 0.5 part of a trimethylsilyl-blocked polydimethylsiloxane with a viscosity of 350 mPa·s at 23° C. and 0.5 part of water was added. Subsequently, 0.5 part of a 1% by weight (based on elemental platinum) solution of a platinum/1,3-divinyl-1,1,3,3-tetramethyldisiloxane complex in an α,ω-divinyldimethylpolysiloxane with a viscosity of 1000 mPa·s at 25° C. was stirred in, 0.25 part of octylphosphonic acid was added at the end and homogeneous mixing was carried out.

The preparation of the B component was carried out by the use of 30 parts of a vinyldimethylsiloxy-terminated polydimethylsiloxane with a viscosity of 20,000 mPa·s at 25° C. and 70 parts of a polymethylhydrosiloxane end-functionalized with trimethylsilyl groups, with a content of Si-bonded hydrogen of 1.7% by weight.

10 parts of the A component and 1 part of the B component were mixed in a beaker to give a homogeneous substance and produced, at ambient temperature, a colorless and odorless partially open-cell, homogeneous vulcanized silicone foam product free from internal pressure with a density of 0.25 g/cm$^3$.

The pot life (PL) was approximately 5 minutes and freedom from tack occurred after approximately 15 minutes. The Shore A hardness of the vulcanized products obtained was determined, and reported in Table 1.

EXAMPLE 2

Preparation of the A Component:

30 parts of a vinyldimethylsiloxy-terminated polydimethylsiloxane with a viscosity of 20,000 mPa·s at 25° C. and 15 parts of a pyrogenic silica with a BET surface of 300 m$^2$/g were processed to give a homogeneous substance. 10 parts of a quartz powder with a mean particle size of 10 μm and 10 parts of calcium carbonate with a mean particle size of 50 μm were added. 10 parts of a trimethylsilyl-terminated polydimethylpolysiloxane with a viscosity of 100 mPa·s at 25° C. were added to this. Furthermore, 1 part of a silicone oil emulsion consisting of 0.5 part of trimethylsilyl-blocked polydimethylsiloxane with a viscosity of 350 mPa·s at 23° C. and 0.5 part of water was added. Subsequently, 0.2 part of a 1% by weight (based on elemental platinum) solution of a platinum/1,3-divinyl-1,1,3,3-tetramethyldisiloxane complex in an α,ω-divinyldimethylpolysiloxane with a viscosity of 1000 mPa·s at 25° C. was stirred in, 0.2 part of octylphosphonic acid was added at the end and homogeneous mixing was carried out.

10 parts of the A component thus obtained and 1 part of the B component, the preparation of which is described in example 1, were mixed in a beaker to give a homogeneous substance and produced, at ambient temperature, an ivory-colored, odorless, partially open-cell, homogeneous silicone foam vulcanized product free from internal pressure with a density of 0.35 g/cm$^3$.

The pot life (PL), freedom from tack and Shore A hardness were determined. The measurement results are given in Table 1.

TABLE 1

| Property | Example 1 | Example 2 |
| --- | --- | --- |
| Color | Colorless | ivory |
| Density | 0.25 | 0.35 |
| Pot life | 3 min | 8 min |
| Freedom from tack | 15 min | 30 min |
| Impression faithfulness | very good | very good |
| Hardness | 8 Shore A | 12 Shore A |
| Cell structure | partly open-cell | partly open-cell |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A composition crosslinkable by attachment of an Si-bonded hydrogen atom to an aliphatic multiple bond, comprising at least one compound of the formula $$R^3P(O)(OH)_2 \quad (III)$$

or derivatives thereof,
wherein $R^3$ is an optionally substituted hydrocarbon radical optionally interrupted by heteroatoms.

2. The crosslinkable composition of claim 1, comprising:
(A) compound(s) which bear radicals with aliphatic carbon-carbon multiple bonds,
(B) organosilicon compounds with Si-bonded hydrogen atoms or, in place of (A) and (B) or together with at least one of (A) and (B),
(AB) organosilicon compounds which bear SiC-bonded radicals with aliphatic carbon-carbon multiple bonds and Si-bonded hydrogen atoms,
(C) at least one compound of the formula (III) or the derivatives thereof, and
(D) at least one catalyst which promotes the attachment of an Si-bonded hydrogen atom to an aliphatic multiple bond.

3. The crosslinkable composition of claim 1, wherein organosilicon compounds (A) are linear or branched organopolysiloxanes comprising units of the formula $$R_a R^1{}_b SiO_{(4-a-b)/2} \quad (I)$$

in which
R are identical or different radicals free of aliphatic carbon-carbon multiple bonds,
$R^1$ are identical or different monovalent, optionally substituted, SiC-bonded hydrocarbon radicals with an aliphatic carbon-carbon multiple bond,
a is 0, 1, 2 or 3 and
b is 0, 1 or 2,
with the proviso that the sum a+b is less than or equal to 3 and, on average, at least 2 radicals $R^1$ are present per molecule.

4. The crosslinkable composition of claim 1, wherein organosilicon compounds (B) are linear, cyclic or branched organopolysiloxanes which comprise units of the formula $$R^2{}_c H_d SiO_{(4-c-d)/2} \quad (II)$$

in which
$R^2$ are identical or different and have the meaning given above for radical R,
c is 1, 2 or 3 and
d is 1 or 2,
with the proviso that the sum of c+d is less than or equal to 3 and, on average, at least two Si-bonded hydrogen atoms are present per molecule.

5. The crosslinkable composition of claim 1, wherein component (C) is an alkylphosphonic acid.

6. The crosslinkable composition of claim 1, wherein component (C) is octylphosphonic acid.

7. The crosslinkable composition of claim 1, wherein component (C) is used in amounts of 0.01 to 10 parts by weight, based on 100 parts by weight of constituent (A).

8. The crosslinkable composition of claim 1, comprising:
(A) compound(s) which bear radicals with aliphatic carbon-carbon multiple bonds,
(B) organopolysiloxanes with Si-bonded hydrogen atoms, or, in place of (A) and (B) or together with at least one of (A) and (B),
(AB) organosilicon compounds which bear both SiC-bonded radicals with aliphatic carbon-carbon multiple bonds and Si-bonded hydrogen atoms,
(C) at least one alkylphosphonic acid,
(D) at least one catalyst which promotes the attachment of an Si-bonded hydrogen to an aliphatic multiple bond, and
optionally,
E) reinforcing fillers.

9. A molded article, prepared by crosslinking a composition of claim 1.

10. The molded article of claim 9, which has a density of 0.1 to 5 g/cm$^3$ at 20° C. and 1013 hPa.

11. A composition crosslinkable by attachment of an Si-bonded hydrogen atom to an aliphatic multiple bond, comprising at least one compound of the formula $$R^3P(O)(OH)_2 \quad (III)$$

or derivatives thereof,
wherein $R^3$ is an optionally substituted hydrocarbon radical optionally interrupted by heteroatoms,
wherein Si-bonded hydrogen atoms are contained in at least one organosilicon compound (B) which is a linear, cyclic or branched organopolysiloxanes which comprise units of the formula $$R^2{}_c H_d SiO_{(4-c-d)/2} \quad (II)$$

in which
$R^2$ are identical or different and have the meaning given above for radical R,
c is 1, 2 or 3 and
d is 1 or 2,
with the proviso that the sum of c+d is less than or equal to 3 and, on average, at least two Si-bonded hydrogen atoms are present per molecule.

12. A composition crosslinkable by attachment of an Si-bonded hydrogen atom to an aliphatic multiple bond, comprising at least one compound of the formula $$R^3P(O)(OH)_2 \quad (III)$$

or derivatives thereof,
wherein $R^3$ is an optionally substituted hydrocarbon radical optionally interrupted by heteroatoms which further comprises water, and which cures upon crosslinking to an elastomeric foam.

13. A composition crosslinkable by attachment of an Si-bonded hydrogen atom to an aliphatic multiple bond, consisting of least one compound of the formula $$R^3P(O)(OH)_2 \quad (III)$$

or derivatives thereof,
wherein $R^3$ is an optionally substituted hydrocarbon radical optionally interrupted by heteroatoms; and
(A) compound(s) which bear radicals with aliphatic carbon-carbon multiple bonds,
(B) organosilicon compounds with Si-bonded hydrogen atoms or, in place of (A) and (B) or together with at least one of (A) and (B),
(AB) organosilicon compounds which bear SiC-bonded radicals with aliphatic carbon-carbon multiple bonds and Si-bonded hydrogen atoms,
(D) at least one catalyst which promotes the attachment of an Si-bonded hydrogen atom to an aliphatic multiple bond,
(E) one or more fillers, the fillers selected from the group consisting of:

pyrogenic or precipitated silicas, carbon blacks, active charcoals, mixed oxides or oxide mixtures of silica with oxides of the metals calcium, barium, zinc, zirconium and/or titanium, quartz powder, diatomaceous earth, silicates, zeolites, iron oxide, zinc oxide, titanium dioxide, metal carbonates, metal sulfates, mica, siloxane resins, clays, treated or untreated graphite and chalk, and mixtures thereof, (F) one or more additives selected from the group consisting of dispersing agents, rheology additives, nonpolar solvents, polar protic components, bonding agents, pigments, dyes, plasticizers, organic polymers, heat stabilizers, fillers for thermal conductivity, and mixtures thereof, (G) one or more additives which adjust one or more of potlife, kick-off temperature, or crosslinking rate, other than a compound of the formula (III).

14. The composition of claim 1, wherein the composition further contains one or more fillers, the fillers selected from the group consisting of
   a) reinforcing fillers selected from the group consisting of pyrogenic silica, precipitated silica, mixed oxides containing silica and a metal selected from the group consisting of aluminum, magnesium, calcium, barium, zinc, zirconium, titanium and mixtures thereof, quartz powder, diatomaceous earth, zeolites, iron oxide, zinc oxide, titanium dioxide, metal carbonates, metal sulfates, mica, siloxane resins, clays, graphite, chalk, and mixtures thereof; and
   b) non-reinforcing fillers selected from the group consisting of synthetic silicates, natural silicates, quartz powder, diatomaceous earth, zeolites, iron oxide, titanium dioxide, metal carbonates, metal sulfates, mica, clays, lithopones, carbon blacks, graphite, chalk, and mixtures thereof.

15. The composition of claim 1, wherein the composition further contains one or more fillers, the fillers selected from the group consisting of reinforcing and non-reinforcing fillers of pyrogenic and precipitated silica, and mixtures thereof.

16. The composition of claim 1, wherein the composition further contains one or more fillers, the fillers selected from the group consisting of reinforcing and non-reinforcing fillers of pyrogenic and precipitated silica, metal carbonates, and mixtures thereof.

17. The crosslinkable composition of claim 1, consisting essentially of:
   (A) compound(s) which bear radicals with aliphatic carbon-carbon multiple bonds,
   (B) organopolysiloxanes with Si-bonded hydrogen atoms, or, in place of (A) and (B) or together with at least one of (A) and (B),
   (AB) organosilicon compounds which bear both SiC-bonded radicals with aliphatic carbon-carbon multiple bonds and Si-bonded hydrogen atoms,
   (C) at least one alkylphosphonic acid,
   (D) at least one catalyst which promotes the attachment of an Si-bonded hydrogen to an aliphatic multiple bond, and
optionally,
   (E) one or more reinforcing fillers selected from the group consisting of pyrogenic and precipitated silica and mixtures thereof as the sole fillers.

* * * * *